US011032548B2

(12) United States Patent
Choi et al.

(10) Patent No.: US 11,032,548 B2
(45) Date of Patent: Jun. 8, 2021

(54) SIGNALING FOR REFERENCE PICTURE RESAMPLING

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/899,202

(22) Filed: Jun. 11, 2020

(65) Prior Publication Data

US 2020/0404279 A1 Dec. 24, 2020

Related U.S. Application Data

(60) Provisional application No. 62/865,955, filed on Jun. 24, 2019.

(51) Int. Cl.
*H04N 19/132* (2014.01)
*H04N 19/196* (2014.01)
(Continued)

(52) U.S. Cl.
CPC ......... *H04N 19/132* (2014.11); *H04N 19/105* (2014.11); *H04N 19/139* (2014.11); *H04N 19/196* (2014.11)

(58) Field of Classification Search
CPC .. H04N 19/132; H04N 19/105; H04N 19/139; H04N 19/196
See application file for complete search history.

(56) References Cited

U.S. PATENT DOCUMENTS

2004/0130664 A1* 7/2004 Stessen .......... H04N 21/440272
348/576
2004/0213345 A1 10/2004 Holcomb et al.
(Continued)

OTHER PUBLICATIONS

"High efficiency video coding", Series H: Audiovisual and Multimedia Systems; Infrastructure of audiovisual services—Coding of moving video; ITU-T. H.265, Feb. 2018, 692 pages.
(Continued)

*Primary Examiner* — Allen C Wong
(74) *Attorney, Agent, or Firm* — Sughrue Mion, PLLC

(57) ABSTRACT

A method, device, and non-transitory computer-readable medium for decoding an encoded video bitstream using at least one processor, including obtaining a coded picture from the encoded video bitstream; decoding the coded picture to generate a decoded picture; obtaining a first flag indicating whether reference picture resampling is enabled; obtaining a second flag indicating whether reference pictures have a constant reference picture size; obtaining a third flag indicating whether output pictures have a constant output picture size indicated in the encoded video bitstream; generating a reference picture by resampling the decoded picture to have the constant reference picture size, and storing the reference picture in a decoded picture buffer; and generating an output picture by resampling the decoded picture to have the constant output picture size, and outputting the output picture.

20 Claims, 8 Drawing Sheets

(51) Int. Cl.
*H04N 19/139* (2014.01)
*H04N 19/105* (2014.01)

(56) References Cited

U.S. PATENT DOCUMENTS

| | | |
|---|---|---|
| 2010/0150231 A1* | 6/2010 | Huang .................. H04N 19/59 375/240.12 |
| 2012/0320984 A1 | 12/2012 | Zhou |
| 2013/0177084 A1 | 7/2013 | Wang et al. |
| 2014/0328398 A1 | 11/2014 | Chen et al. |
| 2015/0334416 A1 | 11/2015 | Holcomb et al. |

OTHER PUBLICATIONS

International Searching Report and Written Opinion dated Sep. 11, 2020 in International Application No. PCT/US2020/038344.

\* cited by examiner

FIG. 4    Encoder 203

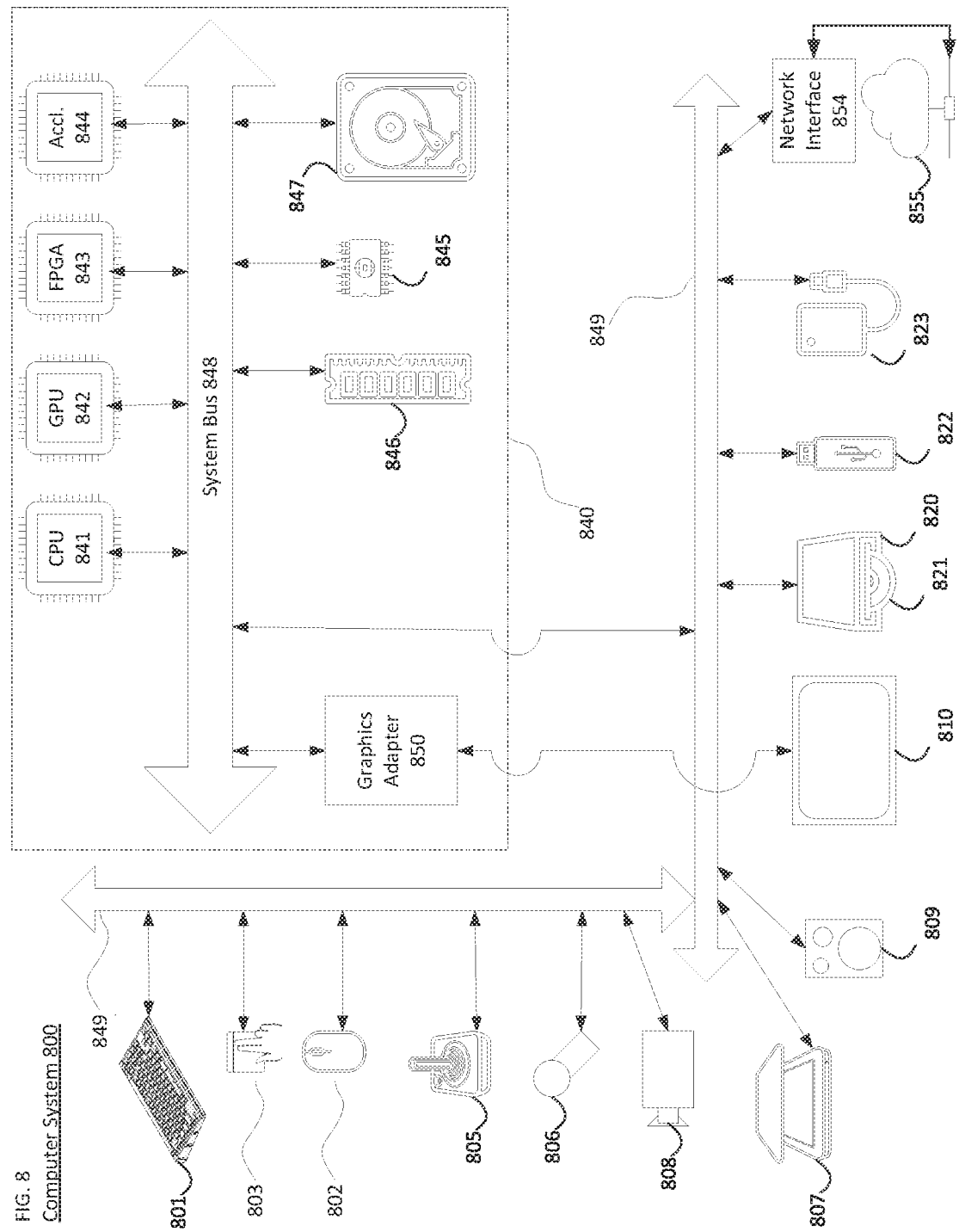

SIGNALING FOR REFERENCE PICTURE RESAMPLING

CROSS-REFERENCE TO RELATED APPLICATION

This application claims priority from 35 U.S.C. § 119 to U.S. Provisional Application No. 62/865,955, filed on Jun. 24, 2019, in the United States Patent & Trademark Office, the disclosure of which is incorporated herein by reference in its entirety.

FIELD

The disclosed subject matter relates to video coding and decoding, and more specifically, to the signaling information relating to reference picture resampling and adaptive resolution change.

BACKGROUND

Video coding and decoding using inter-picture prediction with motion compensation has been known. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Historically, video encoders and decoders tended to operate on a given picture size that was, in most cases, defined and stayed constant for a coded video sequence (CVS), Group of Pictures (GOP), or a similar multi-picture timeframe. For example, in MPEG-2, system designs are known to change the horizontal resolution (and, thereby, the picture size) dependent on factors such as activity of the scene, but only at I pictures, hence typically for a GOP. The resampling of reference pictures for use of different resolutions within a CVS is known, for example, from ITU-T Rec. H.263 Annex P. However, here the picture size does not change, only the reference pictures are being resampled, resulting potentially in only parts of the picture canvas being used (in case of downsampling), or only parts of the scene being captured (in case of upsampling). Further, H.263 Annex Q allows the resampling of an individual macroblock by a factor of two (in each dimension), upward or downward. Again, the picture size remains the same. The size of a macroblock is fixed in H.263, and therefore does not need to be signaled.

Changes of picture size in predicted pictures became more mainstream in modern video coding. For example, VP9 allows reference picture resampling and change of resolution for a whole picture. Similarly, certain proposals made towards VVC (including, for example, Hendry, et. al, "On adaptive resolution change (ARC) for VVC", Joint Video Team document JVET-M0135-v1, Jan. 9-19, 2019, incorporated herein in its entirety) allow for resampling of whole reference pictures to different-higher or lower-resolutions. In that document, different candidate resolutions are suggested to be coded in the sequence parameter set and referred to by per-picture syntax elements in the picture parameter set.

SUMMARY

In an embodiment, there is provided a method of decoding an encoded video bitstream using at least one processor, including obtaining a coded picture from the encoded video bitstream; decoding the coded picture to generate a decoded picture; obtaining from the encoded video bitstream a first flag indicating whether reference picture resampling is enabled; based on the first flag indicating that the reference picture resampling is enabled, obtaining from the encoded video bitstream a second flag indicating whether reference pictures have a constant reference picture size indicated in the encoded video bitstream; based on the first flag indicating that the reference picture resampling is enabled, obtaining from the encoded video bitstream a third flag indicating whether output pictures have a constant output picture size indicated in the encoded video bitstream; based on the second flag indicating that the reference pictures have the constant reference picture size, generating a reference picture by resampling the decoded picture to have the constant reference picture size, and storing the reference picture in a decoded picture buffer; and based on the third flag indicating that the output pictures have the constant output picture size, generating an output picture by resampling the decoded picture to have the constant output picture size, and outputting the output picture.

In an embodiment, there is provided a device for decoding an encoded video bitstream, the device including at least one memory configured to store program code; and at least one processor configured to read the program code and operate as instructed by the program code, the program code including: first obtaining code configured to cause the at least one processor to obtain a coded picture from the encoded video bitstream; decoding code configured to cause the at least one processor to decode the coded picture to generate a decoded picture; second obtaining code configured to cause the at least one processor to obtain from the encoded video bitstream a first flag indicating whether reference picture resampling is enabled; third obtaining code configured to, based on the first flag indicating that the reference picture resampling is enabled, cause the at least one processor to obtain from the encoded video bitstream a second flag indicating whether reference pictures have a constant reference picture size indicated in the encoded video bitstream; fourth obtaining code configured to, based on the first flag indicating that the reference picture resampling is enabled, cause the at least one processor to obtain from the encoded video bitstream a third flag indicating whether output pictures have a constant output picture size indicated in the encoded video bitstream; first generating code configured to, based on the second flag indicating that the reference pictures have the constant reference picture size, cause the at least one processor to generate a reference picture by resampling the decoded picture to have the constant reference picture size, and store the reference picture in a decoded picture buffer; and second generating code configured to, based on the third flag indicating that the output pictures have the constant output picture size, cause the at least one processor to generate an output picture by resampling the decoded picture to have the constant output picture size, and output the output picture.

In an embodiment, there is provided a non-transitory computer-readable medium storing instructions, the instructions including: one or more instructions that, when executed by one or more processors of a device for decoding an encoded video bitstream, cause the one or more processors to: obtain a coded picture from the encoded video bitstream; decode the coded picture to generate a decoded picture; obtain from the encoded video bitstream a first flag indicating whether reference picture resampling is enabled; based on the first flag indicating that the reference picture resampling is enabled, obtain from the encoded video bitstream a second flag indicating whether reference pictures have a constant reference picture size indicated in the encoded video bitstream; based on the first flag indicating that the reference picture resampling is enabled, obtain from the encoded video bitstream a third flag indicating whether output pictures have a constant output picture size indicated in the encoded video bitstream; based on the second flag indicating that the reference pictures have the constant reference picture size, generate a reference picture by resampling the decoded picture to have the constant reference picture size, and store the reference picture in a decoded picture buffer; and based on the third flag indicating that the output pictures have the constant output picture size, generate an output picture by resampling the decoded picture to have the constant output picture size, and output the output picture.

BRIEF DESCRIPTION OF THE DRAWINGS

Further features, the nature, and various advantages of the disclosed subject matter will be more apparent from the following detailed description and the accompanying drawings in which:

FIG. 8 is a schematic illustration of a computer system in accordance with an embodiment.

DETAILED DESCRIPTION

Embodiments disclosed herein may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Figure 1:
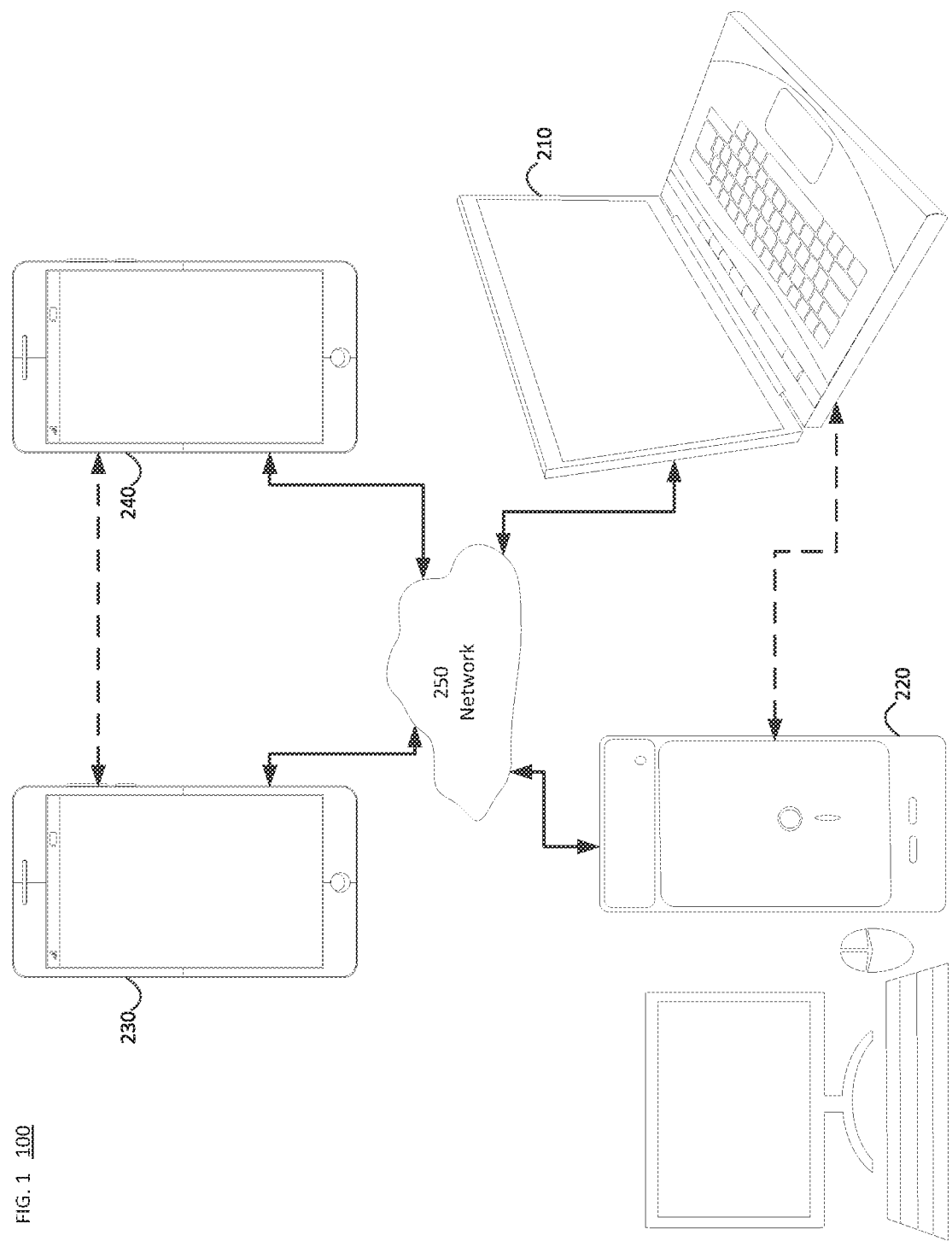
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
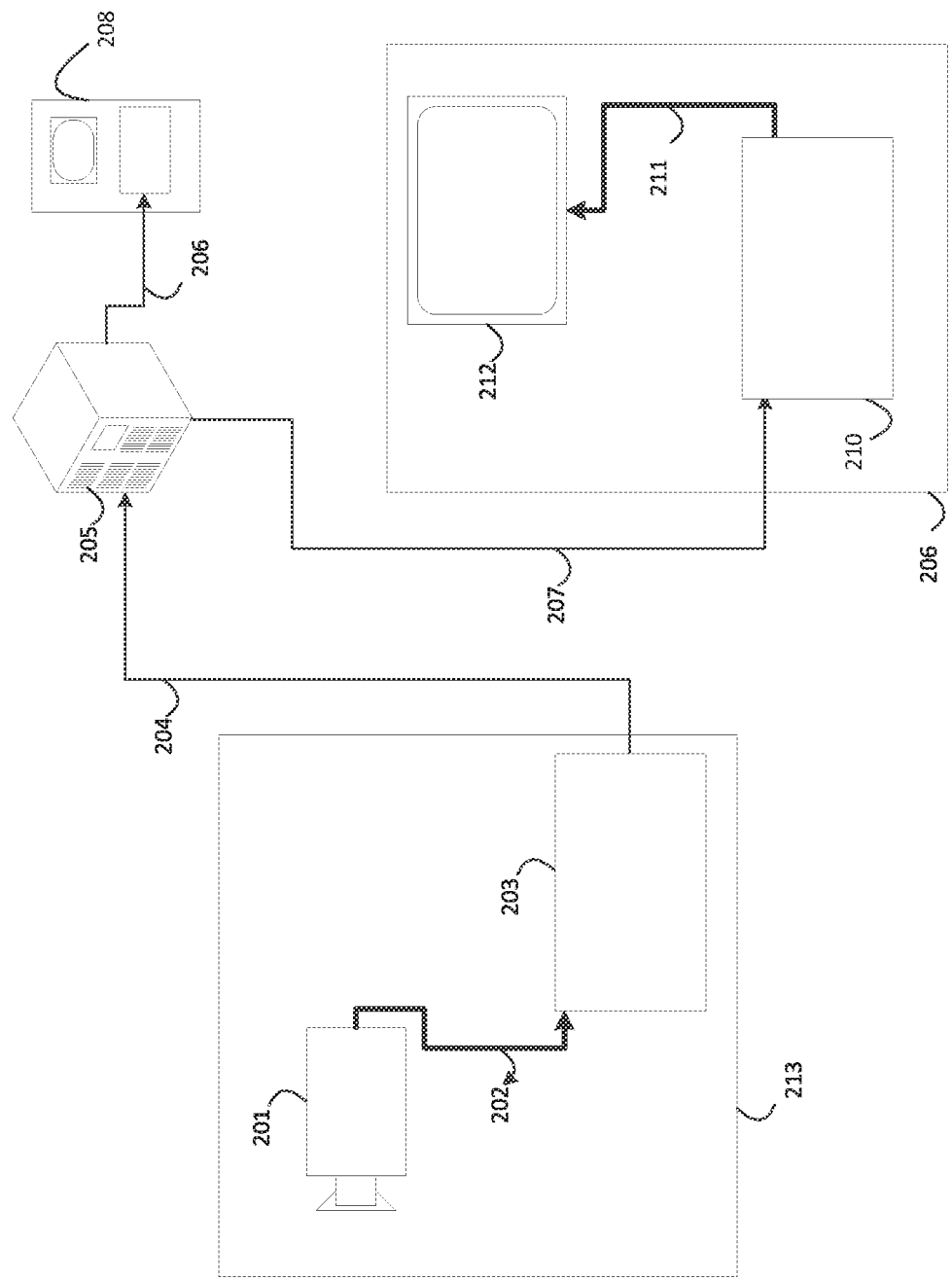
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
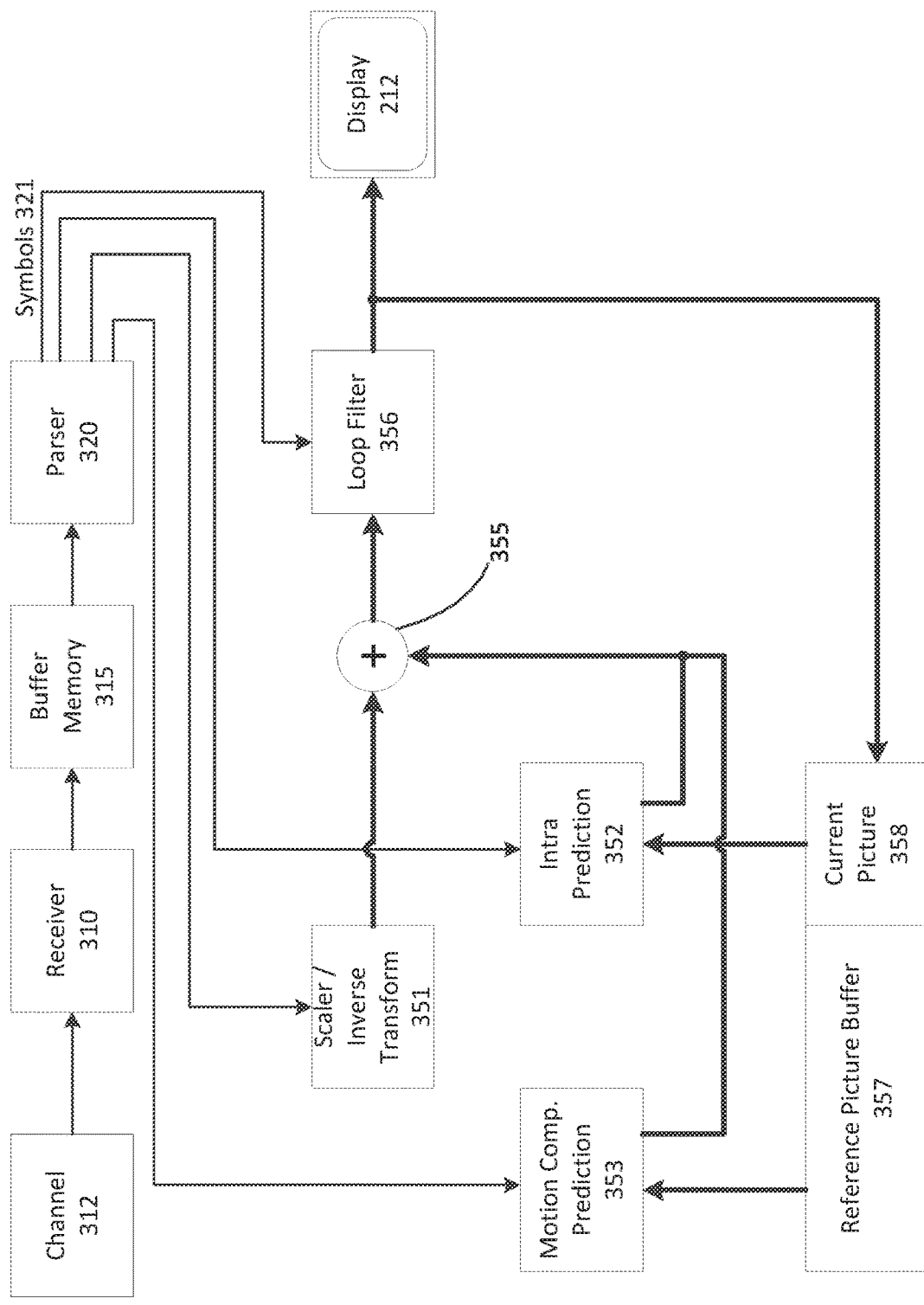
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, sub-pictures, tiles, slices, bricks, macroblocks, Coding Tree Units (CTUs) Coding Units (CUs), blocks, Transform Units (TUs), Prediction Units (PUs) and so forth. A tile may indicate a rectangular region of CU/CTUs within a particular tile column and row in a picture. A brick may indicate a rectangular region of CU/CTU rows within a particular tile. A slice may indicate one or more bricks of a picture, which are contained in an NAL unit. A sub-picture may indicate an rectangular region of one or more slices in a picture. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265.

The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
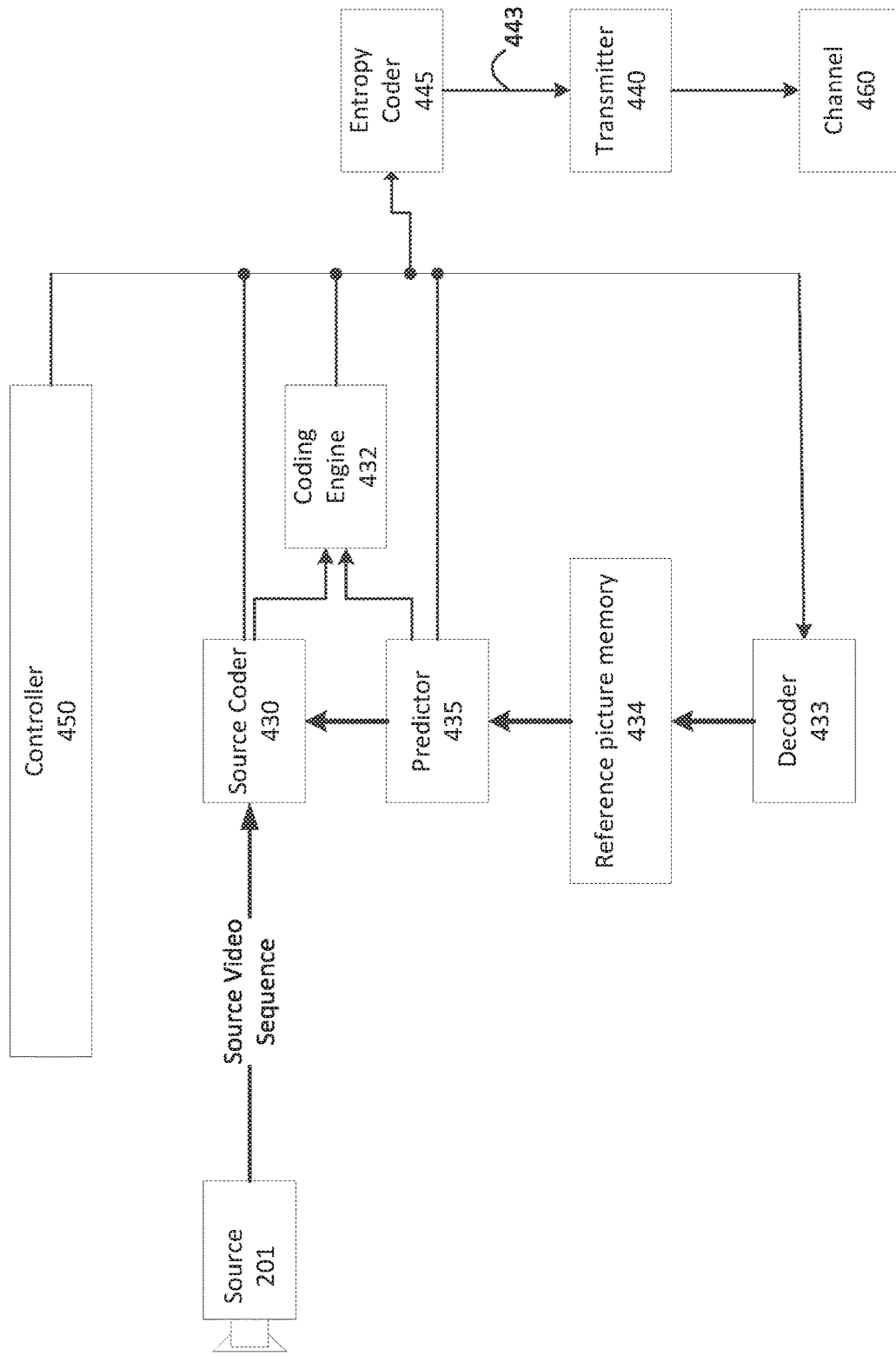
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 4, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
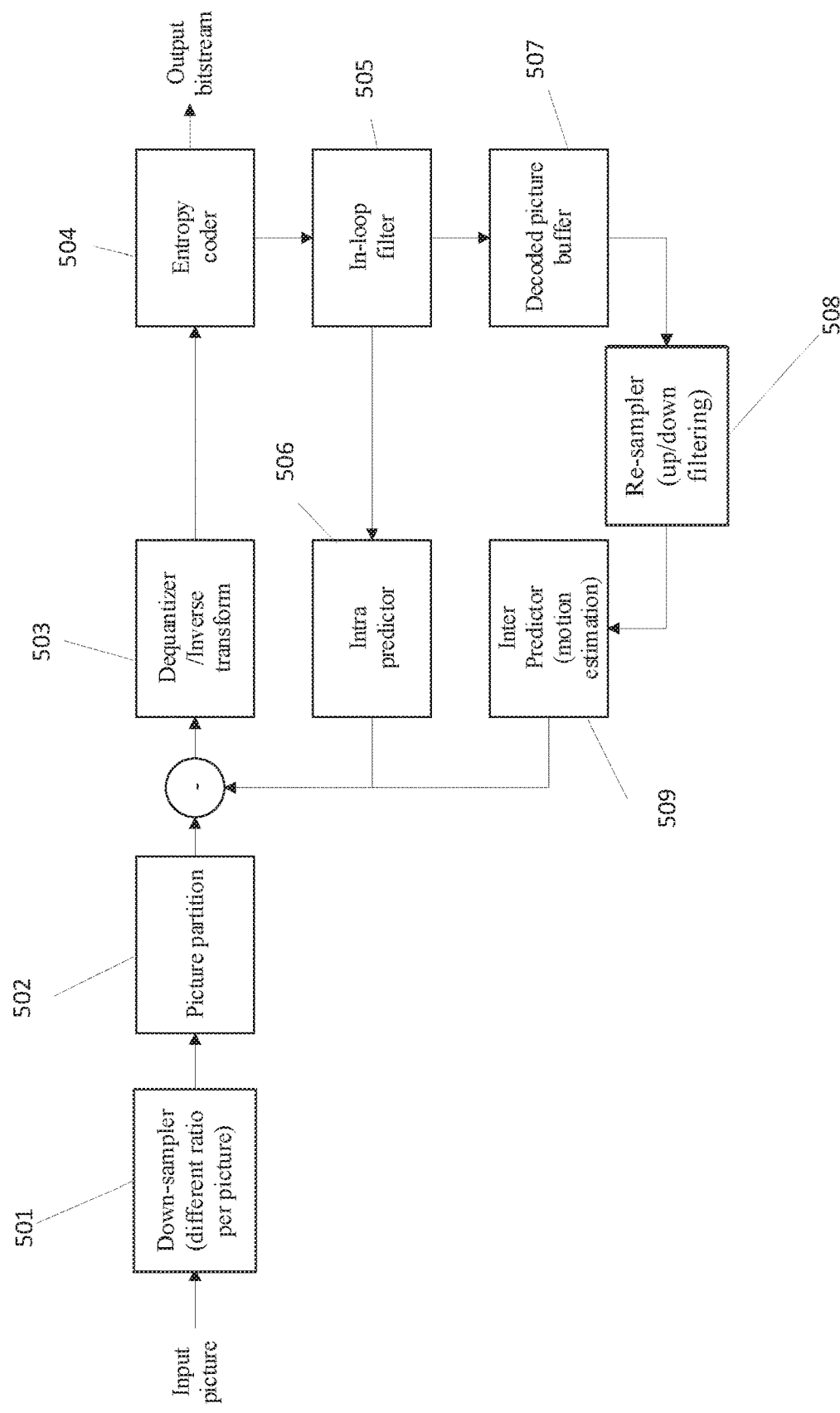
FIG. 5 is a schematic illustration of a simplified block diagram of an encoder in accordance with an embodiment.
Figure 6:
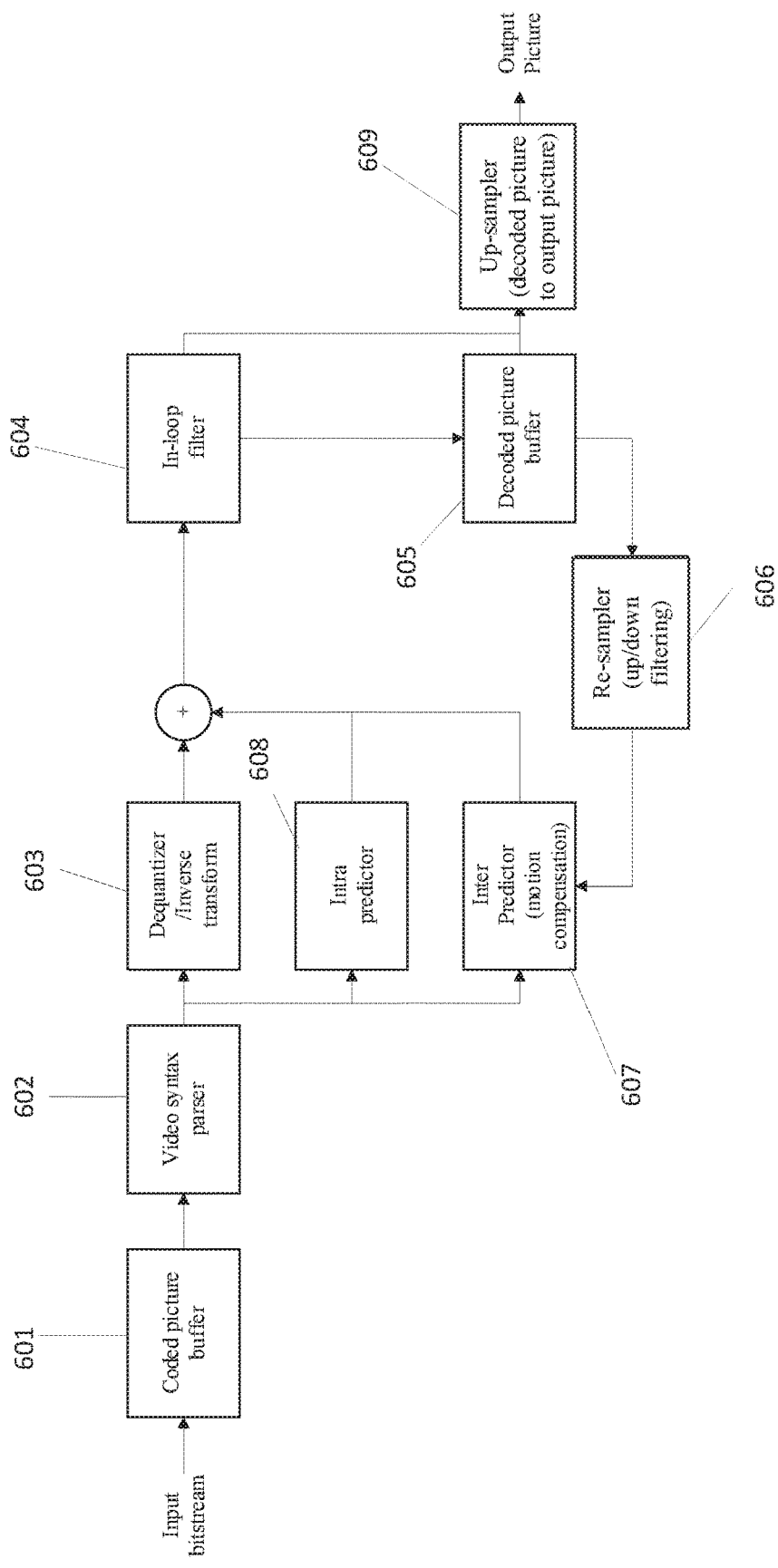
FIG. 6 is a schematic illustration of a simplified block diagram of a decoder in accordance with an embodiment.

FIG. 5 illustrates an example of an encoder 500, according to an embodiment, and FIG. 6 illustrates illustrates an example of an decoder 600 according to an embodiment. Referring to FIG. 5, encoder 500 may include down-sampler 501, picture partitioner 502, dequantizer 503, entropy coder 504, in-loop filter 505, intra-predictor 506, decoded picture buffer (DPB) 507, re-sampler 508, and inter predictor 509.

Referring to FIG. 6, decoder 600 may include coded picture buffer 601, video syntax parser 602, dequantizer 603, in-loop filter 604, decoded picture buffer 605, re-sampler 606, inter predictor 607, and intra predictor 608.

In embodiments, one or more elements illustrated in FIG. 5 and/or FIG. 6 may correspond to, or perform similar functions to, one or more elements illustrated in FIG. 3 and/or FIG. 4.

In embodiments, for example the embodiments illustrated in FIGS. 5 and 6, it is possible to change the picture width and height, on a per picture granularity irrespective of the picture type. At the encoder 500, the input image data may be down-sampled to the selected picture size, using for example down-sampler 501, for the current picture encoding. After the first input picture is encoded as intra-picture, the decoded picture is stored in the DPB 507. When the consequent picture is down-sampled with a different sampling ratio and encoded as inter-picture, the reference pictures in the DPB may be up-scaled or down-scaled according the spatial ratio between the picture size of the reference and the current picture size, using for example re-sampler 508.

At the decoder 600, the decoded picture may be stored in the DPB 605 without resampling. However, the reference picture in the DPB 605 may be up-scaled or down-scaled in relation to the spatial ratio between the currently decoded picture and the reference, for example using re-sampler 606, when used for motion compensation. The decoded picture may be upsampled to the original picture size or the desired output picture size, using for example up-sampler 609, when bumped out for display. In motion estimation/compensation process, motion vectors may be scaled in relation to picture size ratio as well as picture order count difference.

In embodiments, a reference picture resampling (RPR) scheme, as used for example in the embodiments disclosed herein, may include support of adaptive (decoded) picture resolution change within a coded video sequence, support of constant reference picture resolution for simplification of motion compensation process, support of constant output picture resolution for guided display resolution, and support of adaptive resampling modes, both with and without additional filtering.

In embodiments, in order to support the desired features for RPR and adaptive resolution change (ARC), a set of high-level syntax modifications ma be used.

For example, in embodiments, a minimum/maximum picture resolution may be signaled in a decoder parameter set (DPS) to facilitate cap exchange/negotiation.

In embodiments, a flag indicating that RPR is enabled in a coded video sequence may be signaled in a sequence parameter set (SPS). Decoded picture resolutions may be signaled in a table in an SPS. This table may include a list of decoded picture sizes, which may be used by one or more pictures in the coded video sequence.

In embodiments, a flag indicating that any reference picture has the same spatial resolution, and the constant reference picture size may be signaled in an SPS. If the flag value is 1, any decoded picture in the coded video sequence may be up-scaled by a re-sampling process, so that any reference picture stored in DPB may have the same picture size with the reference picture size, signaled in the SPS.

In embodiments, a flag indicating that any output picture has the same spatial resolution, and the constant output picture size may be signaled in an SPS. If the flag value is 1, any output picture in the coded video sequence may be up-scaled by a re-sampling process, so that any outputted picture may have the same picture size with the output picture size, signalled in SPS.

In embodiments, an index indicating the decoded picture size from among the candidates signaled in an SPS may be signaled in a picture parameter set (PPS). This index may be used to facilitate cap exchange/negotiation In embodiments, a flag indicating that motion vector scaling for temporal motion vector prediction is disabled may be signaled in a PPS. If the flag value is 1, any temporal motion vector prediction may be processed without motion vector scaling.

In embodiments, a filter mode selection may be signaled in a PPS.

An example of a DPS syntax for signaling the embodiments discussed above is shown in Table 1 below:

TABLE 1

|  | Descriptor |
| --- | --- |
| dec_parameter_set_rbsp( ) { | |
| ... | |
| max_pic_width_in_luma_samples | ue(v) |
| max_pic_height_in_luma_samples | ue(v) |
| ... | |
| } | |

In embodiments, max_pic_width_in_luma_samples may specify the maximum width of decoded pictures in units of luma samples in the bitstream. max_pic_width_in_luma_samples may not be equal to 0 and may be an integer multiple of MinCbSizeY. The value of max_pic_width_in_luma_samples[i] may not be greater than the value of max_pic_width_in_luma_samples.

In embodiments, max_pic_height_in_luma_samples may specify the maximum height of decoded pictures in units of luma samples. max_pic_height_in_luma_samples may not be equal to 0 and may be an integer multiple of MinCbSizeY. The value of max_pic_height_in_luma_samples[i] may not be greater than the value of max_pic_height_in_luma_samples.

An example of an SPS syntax for signaling the embodiments discussed above is shown in Table 2 below:

TABLE 2

|  | Descriptor |
| --- | --- |
| seq_parameter_set_rbsp( ) { | |
| ... | |
| reference_pic_resampling_flag | u(1) |
| if(reference_pic_resampling_flag) { | |
| num_dec_pic_size_in_luma_samples_minus1 | ue(v) |
| for( i = 0; i <= num_dec_pic_size_in_luma_samples_minus1; i++ ) { | |
| dec_pic_width_in_luma_samples[ i ] | ue(v) |
| dec_pic_height_in_luma_samples[ i ] | ue(v) |
| } | |

TABLE 2-continued

|  | Descriptor |
|---|---|
| constant_ref_pic_size_flag | u(1) |
| if(constant_ref_pic_size_flag) | |
| { | |
|   reference_pic_width_in_luma_samples | ue(v) |
|   reference_pic_height_in_luma_samples | ue(v) |
| } | |
| constant_output_pic_size_flag | u(1) |
|   if(constant_output_pic_size_flag) | |
| { | |
|     output_pic_width_in_luma_samples | ue(v) |
|     output_pic_height_in_luma_samples | ue(v) |
|   } | |
| } | |
| else { | |
|   pic_width_in_luma_samples | ue(v) |
|   pic_height_in_luma_samples | ue(v) |
| } | |
| ... | |
| } | |

In embodiments, reference_pic_resampling_flag equal to 1 may specify that the decoded picture size of a coded picture associated with the SPS may or may not change within the coded video sequence. reference_pic_resampling_flag equal to 0 specifies that the decoded picture size of a coded picture associated with the SPS may not change within the coded video sequence. When the value of reference_pic_resampling_flag is equal to 1, one or more decoded picture sizes (dec_pic_width_in_luma_samples[i], dec_pic_height_in_luma_samples[i]), which may be indicated and used by a coded picture within the coded video sequence, may be present, and a constant reference picture size (reference_pic_width_in_luma_samples, reference_pic_height_in_luma_samples) and a constant output picture size output_pic_width_in_luma_samples, output_pic_height_in_luma_samples) are present, conditioned on the values of constant_ref_pic_size_present_flag and constant_output_pic_size_present_flag, respectively.

In embodiments, constant_ref_pic_size_flag equal 1 may specify that reference_pic_width_in_luma_samplesandreference_pic_height_in_luma_samplesarepresent.

In embodiments, reference_pic_width_in_luma_samples may specify the width of the reference picture in units of luma samples. reference_pic_width_in_luma_samples may not be equal to 0. When not present, the value of reference_pic_width_in_luma_samples may be inferred to be equal to dec_pic_width_in_luma_samples[i].

In embodiments, reference_pic_height_in_luma_samples may specify the height of the reference picture in units of luma samples. reference_pic_height_in_luma_samples may not be equal to 0. When not present, the value of reference_pic_height_in_luma_samples may be inferred to be equal to dec_pic_height_in_luma_samples[i]. The size of the reference picture, stored in DPB, may be equal to the values of reference_pic_width_in_luma_samples and reference_pic_height_in_luma_samples, when the value of constant_pic_size_present_flag is equal to 1. In this case, any additional resampling process may be not performed for motion compensation.

In embodiments, constant_output_pic_size_flag equal 1 may specify that output_pic_width_in_luma_samplesandoutput_pic_height_in_luma_samplesarepresent.

In embodiments, output_pic_width_in_luma_samples may specify the width of the output picture in units of luma samples. output_pic_width_in_luma_samples shall not be equal to 0. When not present, the value of output_pic_width_in_luma_samples may be inferred to be equal to dec_pic_width_in_luma_samples[i].

In embodiments, output_pic_height_in_luma_samples may specify the height of the output picture in units of luma samples. output_pic_height_in_luma_samples may not be equal to 0. When not present, the value of output_pic_height_in_luma_samples may be inferred to be equal to dec_pic_height_in_luma_samples[i]. The size of the output picture may be equal to the values of output_pic_width_in_luma_samples and output_pic_height_in_luma_samples, when the value of constant_output_pic.

In embodiments, num_dec_pic_size_in_luma_samples_minus1 plus 1 may specify the number of the decoded picture size (dec_pic_width_in_luma_samples[i], dec_pic_height_in_luma_samples[i]) in units of luma samples in the coded video sequence.

In embodiments, dec_pic_width_in_luma_samples[i] may specify the i-th width of the decoded picture sizes in units of luma samples in the coded video sequence. dec_pic_width_in_luma_samples[i] may not be equal to 0 and may be an integer multiple of MinCbSizeY.

In embodiments, dec_pic_height_in_luma_samples[i] may specify the i-th height of the decoded picture sizes in units of luma samples in the coded video sequence. dec_pic_height_in_luma_samples[i] may not be equal to 0 and may be an integer multiple of MinCbSizeY. The i-th decoded picture size (dec_pic_width_in_luma_samples[i], dec_pic_height_in_luma_samples[i]) may be equal to the decoded picture size of the decoded picture in the coded video sequence.

An example of aPPS syntax for signaling the embodiments discussed above is shown in Table 3 below:

TABLE 3

|  | Descriptor |
|---|---|
| pic_parameter_set_rbsp( ) { | |
|   ... | |
|   if(reference_pic_resampling_flag) { | |
|     dec_pic_size_idx | ue(v) |
|     disabling_motion_vector_scaling_flag | u(1) |
|     rpr_resampling_mode | u(2) |
|   } | |
|   ... | |
| } | |

In embodiments, dec_pic_size_idx may specify that the width of the decoded picture shall be equal to pic_width_in_lumasamples[dec_pic_size_idx] and the height of the decoded picture shall be equal to pic_height_in_luma_samples[dec_pic_size_idx].

In embodiments, disabling_motion_vector_scaling_flag equal 1 may specify that a reference motion vector is used without scaling process dependent on POC values or spatial resolutions for temporal motion vector prediction. disabling_ motion_vector_scaling_flag equal 0 may specify that a reference motion vector is used with or without scaling process dependent on POC values or spatial resolutions for temporal motion vector prediction.

In embodiments, rpr_resampling_mode equal 0 may indicate that the interpolated pixels in a reference picture are not additionally filtered for motion compensation when the resolution of the current picture is different from the that of the reference picture. rpr_resampling_mode equal 1 may indicate that the interpolated pixels in a reference picture are additionally filtered for motion compensation, when the resolution of the current picture is different from the that of the reference picture. rpr_resampling_mode equal 2 may indicate that the pixels in a reference picture are filtered and interpolated for motion compensation, when the resolution of the current picture is different from the that of the reference picture. Other values may be reserved.

ARC may be included in the "baseline/main" profiles. Sub-profiling may be used to remove them if not needed for certain application scenarios. Certain restrictions may be acceptable. In that regard, certain H.263+ profiles and "recommended modes" (which pre-dated profiles) included a restriction for Annex P to be used only as "implicit factor of 4", i.e. dyadic downsampling in both dimensions. That was enough to support fast start (get the I frame over quickly) in video conferencing.

In embodiments, all filtering can be done "on the fly" and there may be no, or only negligible, increases in memory bandwidth. As a result, it may not be necessary to place ARC into exotic profiles.

Complex tables and such may not be meaningfully used in capability exchange, as it was argued in Marrakech in conjunction with JVET-M0135. The number of options may be simply too big to allow for meaningful cross-vendor interoperability, assuming offer-answer and similar limited-depth handshakes. To support ARC in a meaningful way in a capability exchange scenario, a handful of interop points may be used. For example: no ARC, ARC with implicit factor of 4, full ARC. As an alternative, we could spec the required support for all ARC, and leave the restrictions in bitstream complexity to higher level SDOs.

As for levels, as a condition of bitstream conformance in some embodiments, the sample count of an upsampled pictures must fit into level of bitstream no matter how much upsampling is signalled in bitstream, and that all samples must fit into the upsampled coded picture. We note that this was not the case in H263+; there, it was possible that certain samples were not present.

Figure 7:
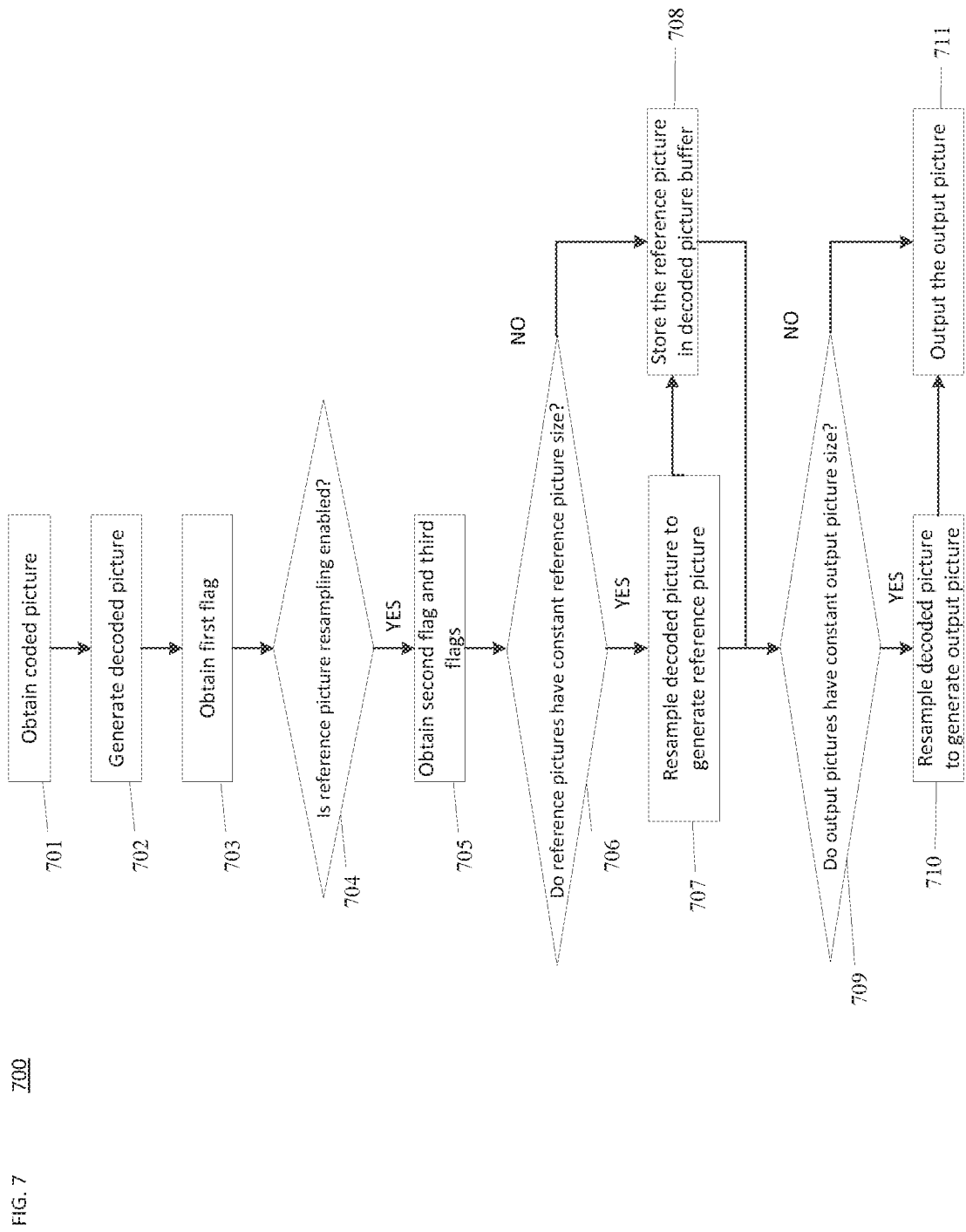
FIG. 7 is a flowchart of an example process for decoding an encoded video bitstream in accordance with an embodiment.

FIG. 7 is a flowchart is an example process 700 for decoding an encoded video bitstream in accordance with embodiments discussed above. In some implementations, one or more process blocks of FIG. 7 may be performed by decoder 210 or decoder 600. In some implementations, one or more process blocks of FIG. 7 may be performed by another device or a group of devices separate from or including decoder 210 or decoder 600, such as encoder 203 or encoder 500.

As shown in FIG. 7, process 700 may include obtaining a coded picture from the encoded video bitstream (block 701).

As further shown in FIG. 7, process 700 may include decoding the coded picture to generate a decoded picture (block 702).

As further shown in FIG. 7, process 700 may include obtaining from the encoded video bitstream a first flag indicating whether reference picture resampling is enabled (block 703). In embodiments, the first flag may correspond to reference_pic_resampling_flag described above.

As further shown in FIG. 7, process 700 may include determining from the first flag whether reference picture resampling is enabled (block 704). If reference picture resampling is enabled (YES at block 704), process 700 may proceed to block 705. In embodiments, if reference picture resampling is not enabled, process 700 may decode the encoded video bitstream according to a different process.

As further shown in FIG. 7, process 700 may include obtaining from the encoded video bitstream a second flag indicating whether reference pictures have a constant reference picture size indicated in the encoded video bitstream, and a third flag indicating whether output pictures have a constant output picture size indicated in the encoded video bitstream (block 705). In embodiments, the second flag may correspond to the constant_ref_pic_size_flag described above, and the third flag may correspond to the constant_output_pic_size_flag described above.

As further shown in FIG. 7, process 700 may include determining whether the second flag indicates that the reference pictures have the constant reference picture size (block 706). If the reference pictures have the constant reference picture size (YES at block 706), process 700 may proceed to block 707 and then to block 708. If the reference pictures do not have the constant reference picture size (NO at block 706), process 700 may proceed directly to block 708.

As further shown in FIG. 7, process 700 may include generating a reference picture by resampling the decoded picture to have the constant reference picture size (block 707).

As further shown in FIG. 7, process 700 may include storing the reference picture in a decoded picture buffer (block 708). If block 707 is not performed, the decoded picture may be stored as the reference picture without resampling As further shown in FIG. 7, process 700 may include determining whether the third flag indicates that the output pictures have the constant output picture size (block 709). If the output pictures have the constant output picture size (YES at block 709), process 700 may proceed to block 710 and then to block 711. If the output pictures do not have the constant output picture size (NO at block 709), process 700 may proceed directly to block 711.

As further shown in FIG. 7, process 700 may include generating an output picture by resampling the decoded picture to have the constant output picture size (block 710).

As further shown in FIG. 7, process 700 may include outputting the output picture (block 711). If block 710 is not performed, the decoded picture may be output as the output picture without resampling.

In embodiments, the first flag, the second flag, and the third flag may be signaled in a sequence parameter set included in the encoded video bitstream.

In embodiments, process 700 may further include obtaining picture resolution information from the encoded video bitstream, wherein the picture resolution information indicates at least one from among a maximum picture resolution and a minimum picture resolution.

In embodiments, the picture resolution information may be signaled in a decoder parameter set included in the encoded video bitstream.

In embodiments, process 700 may further include obtaining a list of picture sizes from the encoded video bitstream.

In embodiments, process 700 may further include obtaining an index indicating a picture size of the decoded picture within the list of picture sizes.

In embodiments, the list of picture sizes may be signaled in a sequence parameter set included in the encoded video bitstream, and the index may be signaled in a picture parameter set included in the encoded video bitstream.

In embodiments, process 700 may further include obtaining a fourth flag indicating whether motion vector scaling is enabled. In embodiments, the fourth flag may correspond to the disabling_motion_vector_scaling_flag described above.

In embodiments, the fourth flag may be signaled in a picture parameter set included in the encoded video bitstream.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media.

For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810 and associated graphics adapter 850, data-glove 1204, joystick 805, microphone 806, scanner 807, camera 808.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, data-glove 1204, or joystick 805, but there can also be tactile feedback devices that do not serve as input devices), audio output devices (such as: speakers 809, headphones (not depicted)), visual output devices (such as screens 810 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD or the like media 821, thumb-drive 822, removable hard drive or solid state drive 823, legacy magnetic media such as tape and floppy disc (not depicted), specialized ROM/ASC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface(s) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (954) that attached to certain general purpose data ports or peripheral buses (949) (such as, for example universal serial bus (USB) ports of the computer system 800; others are commonly integrated into the core of the computer system 800 by attachment to a system bus as described below (for example Ethernet interface into a PC computer system or cellular network interface into a smartphone computer system). As an example, network 855 may be connected to peripheral bus 849 using network interface 854. Using any of these networks, computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (954) as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators 844 for certain tasks, and so forth. These devices, along with Read-only memory (ROM) 845, Random-access memory (RAM) 846, internal mass storage such as internal non-user accessible hard drives, solid-state drives (SSDs), and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include peripheral component interconnect (PCI), USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieve to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of decoding an encoded video bitstream using at least one processor, the method comprising:
obtaining a coded picture from the encoded video bitstream;
decoding the coded picture to generate a decoded picture;
obtaining from the encoded video bitstream a first flag indicating whether reference picture resampling is enabled;
based on the first flag indicating that the reference picture resampling is enabled, obtaining from the encoded video bitstream a second flag indicating whether reference pictures have a constant reference picture size indicated in the encoded video bitstream;
based on the first flag indicating that the reference picture resampling is enabled, obtaining from the encoded video bitstream a third flag indicating whether output pictures have a constant output picture size indicated in the encoded video bitstream;
based on the second flag indicating that the reference pictures have the constant reference picture size, generating a reference picture by resampling the decoded picture to have the constant reference picture size, and storing the reference picture in a decoded picture buffer; and
based on the third flag indicating that the output pictures have the constant output picture size, generating an output picture by resampling the decoded picture to have the constant output picture size, and outputting the output picture.

2. The method of claim 1, wherein the first flag, the second flag, and the third flag are signaled in a sequence parameter set included in the encoded video bitstream.

3. The method of claim 1, further comprising obtaining picture resolution information from the encoded video bitstream,
wherein the picture resolution information indicates at least one from among a maximum picture resolution and a minimum picture resolution.

4. The method of claim 3, wherein the picture resolution information is signaled in a decoder parameter set included in the encoded video bitstream.

5. The method of claim 1, further comprising obtaining a list of picture sizes from the encoded video bitstream.

6. The method of claim 5, further comprising obtaining an index indicating a picture size of the decoded picture within the list of picture sizes.

7. The method of claim 6, wherein the list of picture sizes is signaled in a sequence parameter set included in the encoded video bitstream, and
wherein the index is signaled in a picture parameter set included in the encoded video bitstream.

8. The method of claim 1, further comprising obtaining a fourth flag indicating whether motion vector scaling is enabled.

9. The method of claim 8, wherein the fourth flag is signaled in a picture parameter set included in the encoded video bitstream.

10. A device for decoding an encoded video bitstream, the device comprising:
- at least one memory configured to store program code; and
- at least one processor configured to read the program code and operate as instructed by the program code, the program code including:
  - first obtaining code configured to cause the at least one processor to obtain a coded picture from the encoded video bitstream;
  - decoding code configured to cause the at least one processor to decode the coded picture to generate a decoded picture;
  - second obtaining code configured to cause the at least one processor to obtain from the encoded video bitstream a first flag indicating whether reference picture resampling is enabled;
  - third obtaining code configured to, based on the first flag indicating that the reference picture resampling is enabled, cause the at least one processor to obtain from the encoded video bitstream a second flag indicating whether reference pictures have a constant reference picture size indicated in the encoded video bitstream;
  - fourth obtaining code configured to, based on the first flag indicating that the reference picture resampling is enabled, cause the at least one processor to obtain from the encoded video bitstream a third flag indicating whether output pictures have a constant output picture size indicated in the encoded video bitstream;
  - first generating code configured to, based on the second flag indicating that the reference pictures have the constant reference picture size, cause the at least one processor to generate a reference picture by resampling the decoded picture to have the constant reference picture size, and store the reference picture in a decoded picture buffer; and
  - second generating code configured to, based on the third flag indicating that the output pictures have the constant output picture size, cause the at least one processor to generate an output picture by resampling the decoded picture to have the constant output picture size, and output the output picture.

11. The device of claim 10, wherein the first flag, the second flag, and the third flag are signaled in a sequence parameter set included in the encoded video bitstream.

12. The device of claim 10, wherein the program code further comprises fourth obtaining code configured to cause the at least one processor to obtain picture resolution information from the encoded video bitstream,
wherein the picture resolution information indicates at least one from among a maximum picture resolution and a minimum picture resolution.

13. The device of claim 12, wherein the picture resolution information is signaled in a decoder parameter set included in the encoded video bitstream.

14. The device of claim 10, wherein the program code further comprises fifth obtaining code configured to cause the at least one processor to obtain a list of picture sizes from the encoded video bitstream.

15. The device of claim 14, wherein the program code further comprises sixth obtaining code configured to cause the at least one processor to obtain an index indicating a picture size of the decoded picture within the list of picture sizes.

16. The device of claim 15, wherein the list of picture sizes is signaled in a sequence parameter set included in the encoded video bitstream, and
wherein the index is signaled in a picture parameter set included in the encoded video bitstream.

17. The device of claim 10, wherein the program code further comprises seventh obtaining code configured to cause the at least one processor to obtain a fourth flag indicating whether motion vector scaling is enabled.

18. The device of claim 17, wherein the fourth flag is signaled in a picture parameter set included in the encoded video bitstream.

19. A non-transitory computer-readable medium storing instructions, the instructions comprising: one or more instructions that, when executed by one or more processors of a device for decoding an encoded video bitstream, cause the one or more processors to:
- obtain a coded picture from the encoded video bitstream;
- decode the coded picture to generate a decoded picture;
- obtain from the encoded video bitstream a first flag indicating whether reference picture resampling is enabled;
- based on the first flag indicating that the reference picture resampling is enabled, obtain from the encoded video bitstream a second flag indicating whether reference pictures have a constant reference picture size indicated in the encoded video bitstream;
- based on the first flag indicating that the reference picture resampling is enabled, obtain from the encoded video bitstream a third flag indicating whether output pictures have a constant output picture size indicated in the encoded video bitstream;
- based on the second flag indicating that the reference pictures have the constant reference picture size, generate a reference picture by resampling the decoded picture to have the constant reference picture size, and store the reference picture in a decoded picture buffer; and
- based on the third flag indicating that the output pictures have the constant output picture size, generate an output picture by resampling the decoded picture to have the constant output picture size, and output the output picture.

20. The non-transitory computer-readable medium of claim 19, wherein the first flag, the second flag, and the third flag are signaled in a sequence parameter set included in the encoded video bitstream.

* * * * *